Feb. 1, 1927.

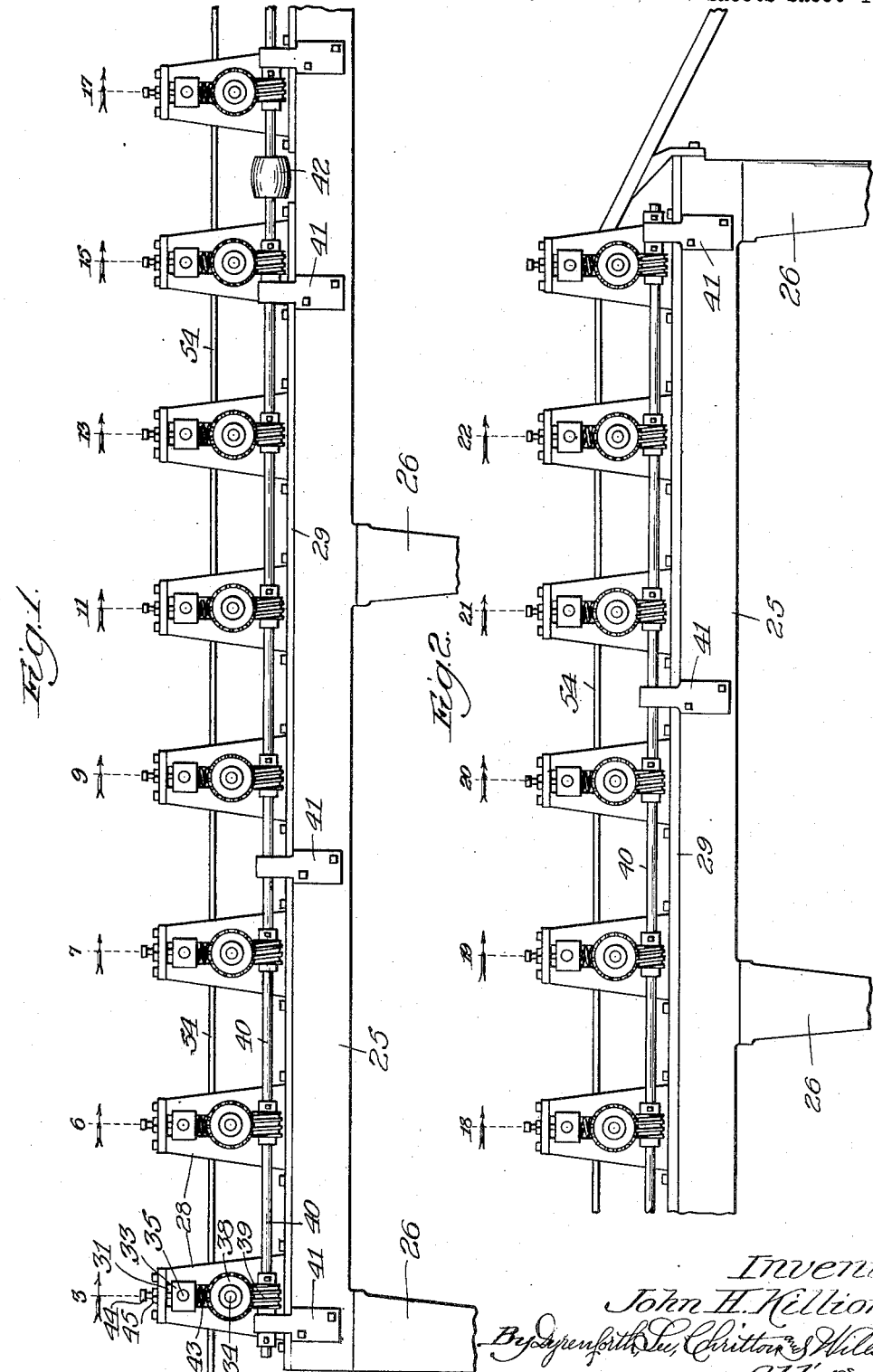

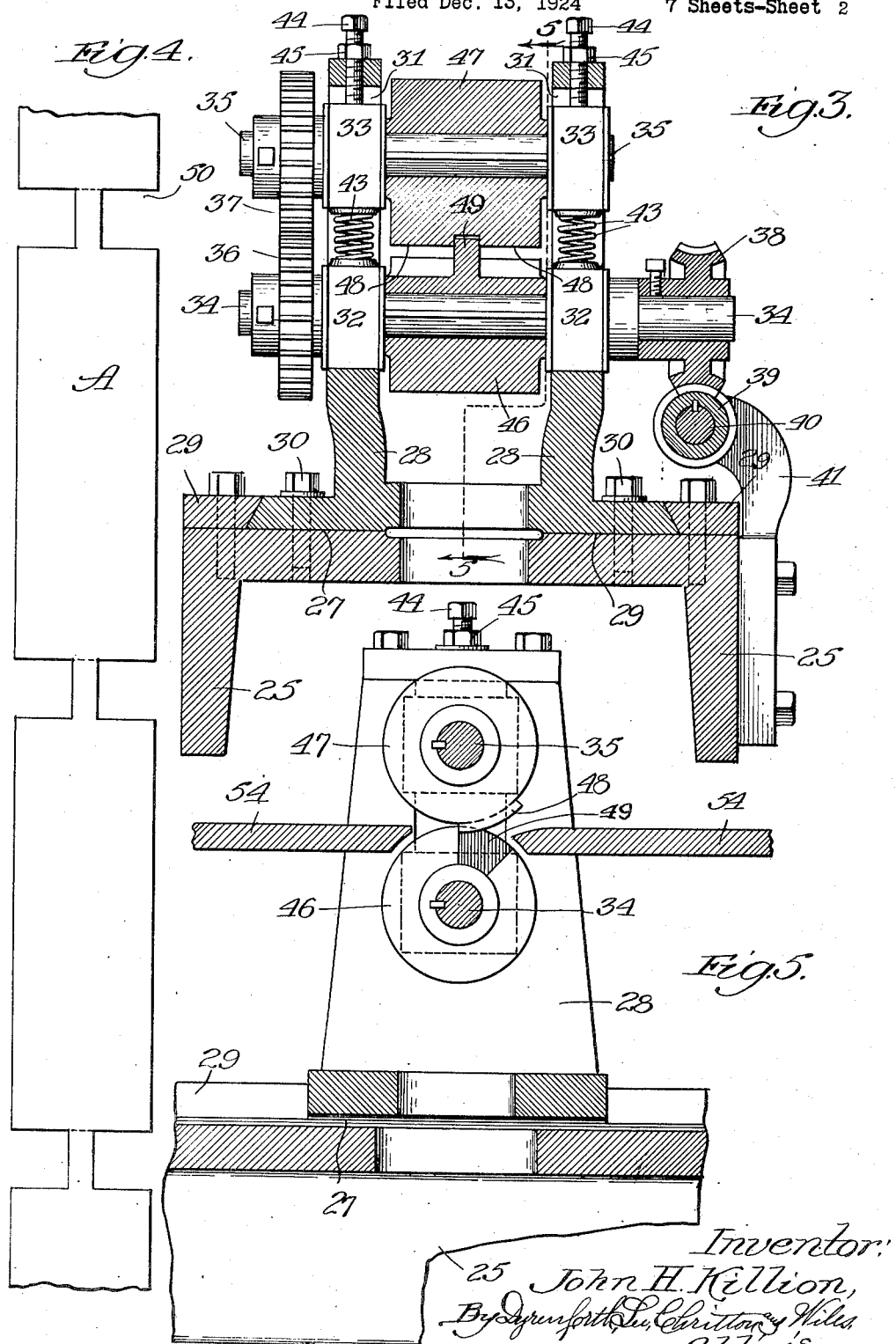

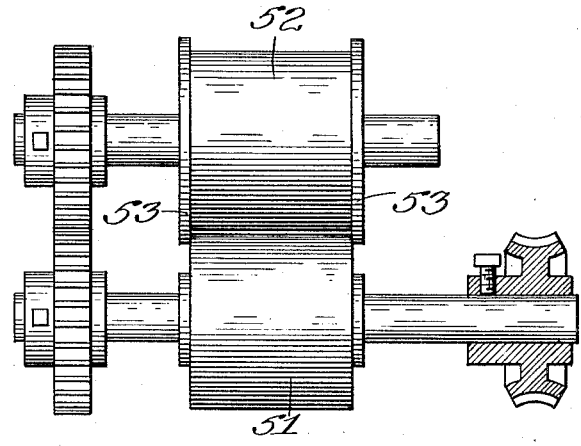
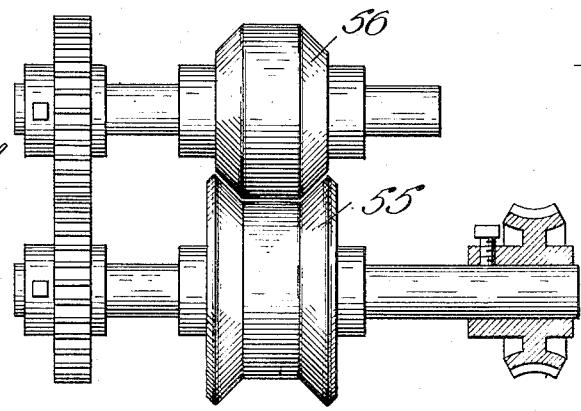
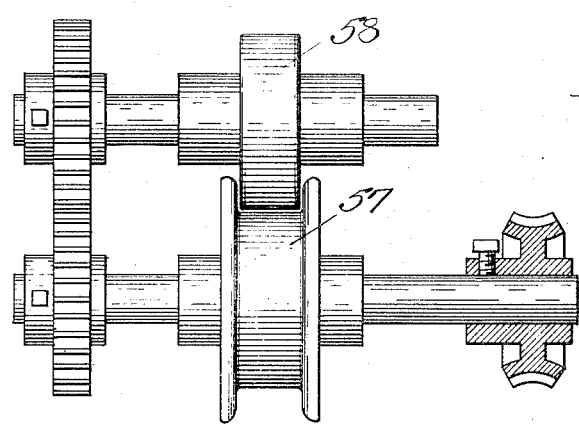

J. H. KILLION 1,615,984

MACHINE FOR MAKING GROOVED STRIPS

Filed Dec. 13, 1924    7 Sheets-Sheet 4

Inventor:
John H. Killion,
By Dyrenforth, Lee, Chritton and Wiles,
Attys.

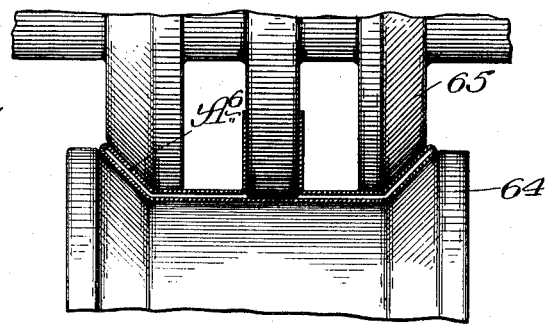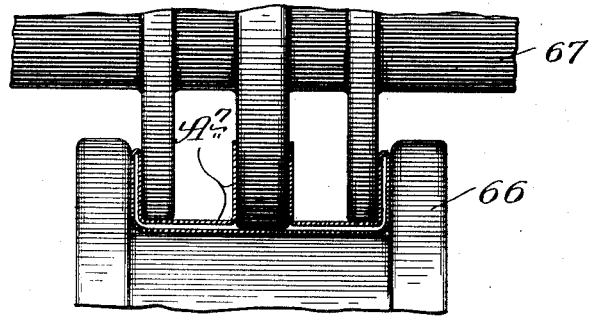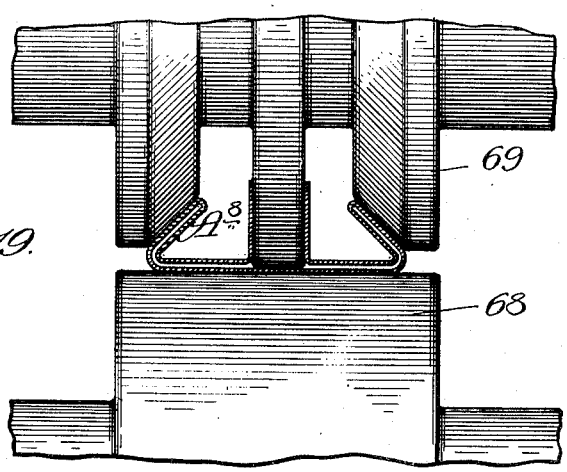

Feb. 1, 1927.

J. H. KILLION 1,615,984

MACHINE FOR MAKING GROOVED STRIPS

Filed Dec. 13, 1924  7 Sheets-Sheet 7

Inventor:
John H. Killion,
By Dyrenforth, Lee, Chritton & Wiles
Attys

Patented Feb. 1, 1927.

1,615,984

UNITED STATES PATENT OFFICE.

JOHN H. KILLION, OF CHICAGO, ILLINOIS.

MACHINE FOR MAKING GROOVED STRIPS.

Application filed December 13, 1924. Serial No. 755,703.

This invention relates to machines for making grooved strips such as will serve as a lock for oppositely curved and flanged edges of a metal container. The invention is fully described in the following specification and shown in the accompanying drawings, in which:

Figure 1 is a partial side elevation of the machine embodying the invention;

Fig. 2 is continuation of the same;

Fig. 3 is an enlarged sectional view on the line 3 of Fig. 1, showing the first set of rotary shearing rollers;

Fig. 4 is a front elevation of a strip of metal having been acted upon by feed rollers;

Fig. 5 is a transverse vertical section on the line 5—5 of Fig. 3;

Fig. 6 is a section on the line 6 of Fig. 1, showing a pair of feed rolls;

Fig. 7 is a similar section on the line 7 of Fig. 1 showing the first pair of forming rolls;

Fig. 8 is an enlarged section of the strip after having been acted upon by said forming rolls;

Fig. 9 is a section on the line 9 of Fig. 1, showing the second pair of forming rolls;

Fig. 10 is a section of the strip after having passed the forming rolls of Fig. 9;

Fig. 17 is an enlarged section on the line 17 of Fig. 1, showing the forming rolls with a strip therein in the form in which it emerges from these rolls;

Figure 23:
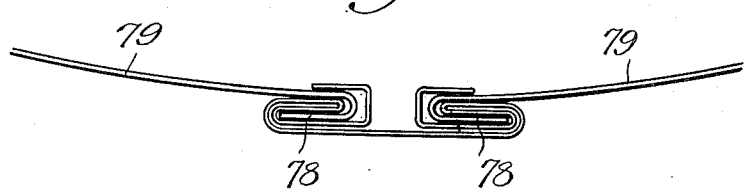
Figure 24:
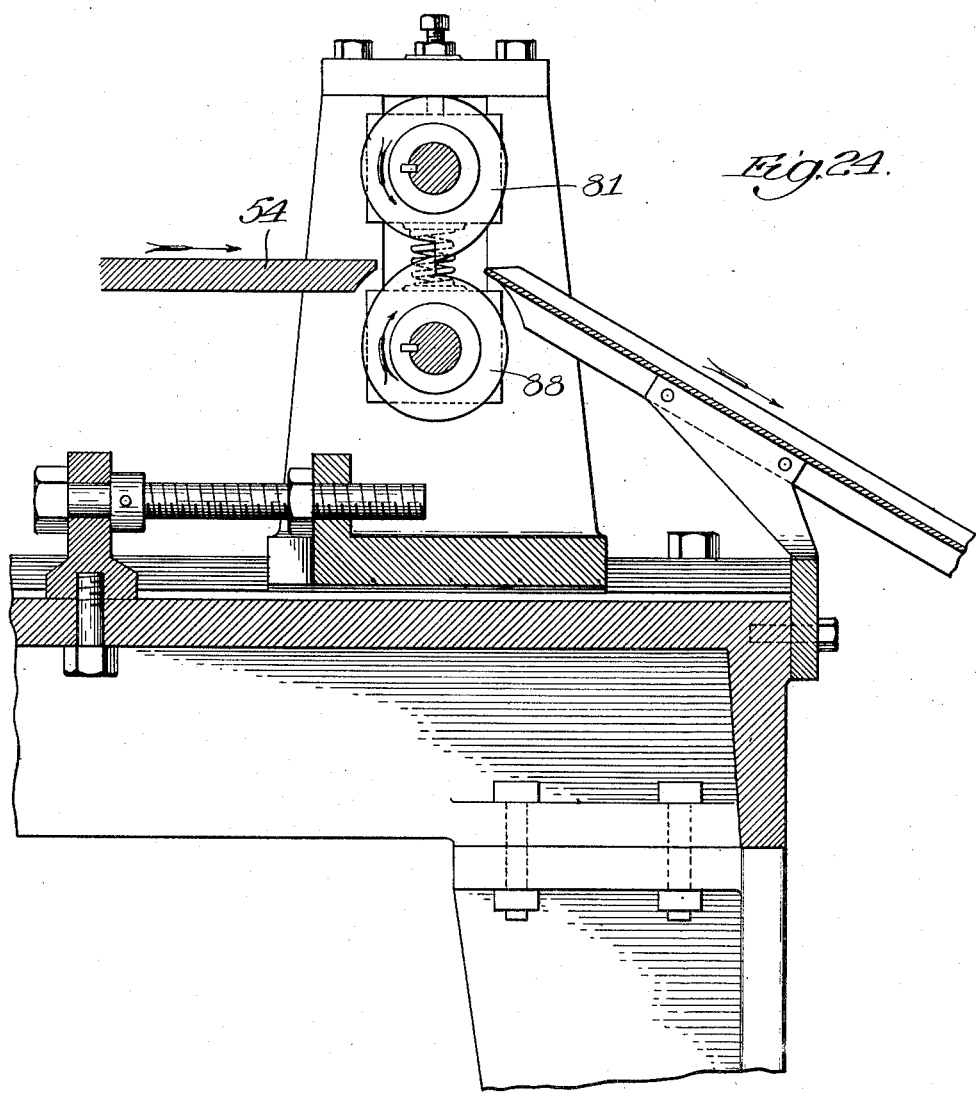

Figs. 18, 19, 20, 21 and 22 are similar views taken on the lines 18, 19, 20, 21 and 22 respectively;

Fig. 23 is a transverse view of the grooved strip as applied to a container; and Fig. 24 is a vertical longitudinal section through the next pair of rolls at the right hand end of Fig. 2.

The embodiment illustrated comprises a machine having a main frame 25 and is supported on suitable legs 26 and which has a machined upper surface 27 upon which is adjustably secured a series of carriages 28 which are held between longitudinally beveled strips 29 and secured by means of bolts 30.

Each of these carriages has two vertical ears in which are disposed vertical slots 31 which are adapted to receive lower journal boxes 32 and upper journal boxes 33 in which are journaled shafts 34 and 35 which carry meshing gears 36 and 37. The shaft 36 has a worm gear secured thereto which meshes with a worm wheel 39 on the shaft 40.

The shaft 40 extends throughout the length of the machine and is journaled in suitable bearings 41 and driven by means of a pulley 42 from a source of power, not shown. Several shearing and forming rolls which will hereafter be described are all mounted in substantially the same way and all are driven from the longitudinal power shaft 40. The springs 43 are placed between the journals 32 and 33, the latter being adjustable by means of a screw 44 and lock-nut 45.

Rotary shearing rolls 46 and 47 are keyed upon the shafts 34 and 35, the roller 47 having side cutting jaws 48 which mesh with openings 49 whereby recesses 50 are cut at regular intervals from the sides of the strip A as shown in Fig. 4.

After passing the first pair of shearing rollers the strip A passes between feed rolls 51 and 52 which are mounted and driven similarly to those previously described. While only this one pair of strictly feed rolls are shown, it will be understood that others may be inserted where necessary to propel the strip through the machine. One of these rolls has flanges 53 to serve as a guide for the strip A. Between the several rolls is a table 54 which extends between the rolls as shown in Figs. 1, 2, 5 and 24. This table serves to maintain the strip at the proper level while passing through the machine.

Figure 12:
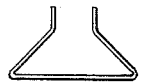
Fig. 12 is a transverse section of the strip as it emerges from the forming rolls.
Figure 11:
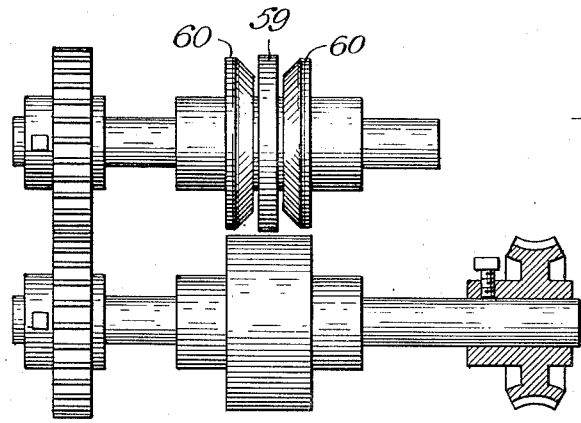
Fig. 11 is a section on the line 11 of Fig. 1, showing the third set of forming rolls.
Figure 14:
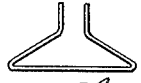
Fig. 14 is a transverse section of the strip as it emerges from the forming rolls of Fig. 13.
Figure 13:
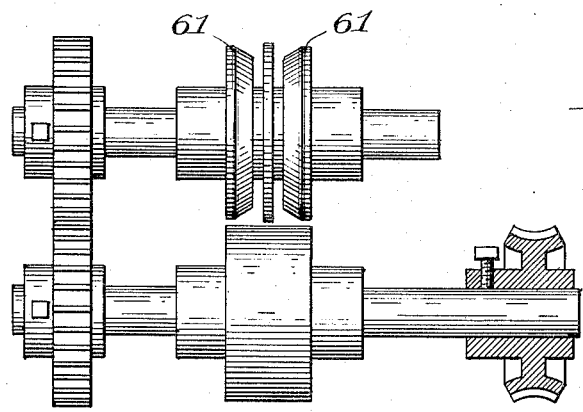
Fig. 13 is a vertical section on the line 13 of Fig. 1.
Figure 16:
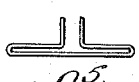
Fig. 16 is a transverse section of the strip as it emerges from the forming rolls of Fig. 15.
Figure 15:
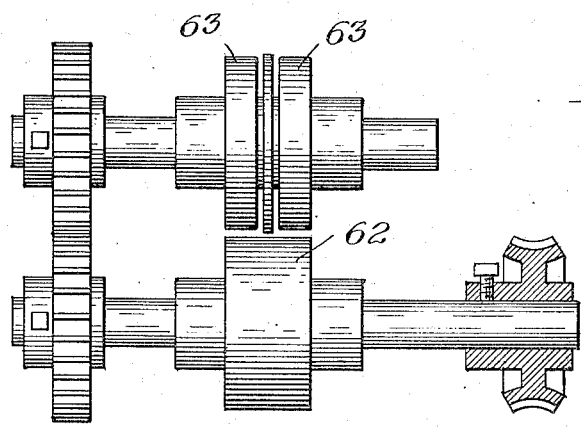
Fig. 15 is a transverse section on the line 15 of Fig. 1.
Figure 20:
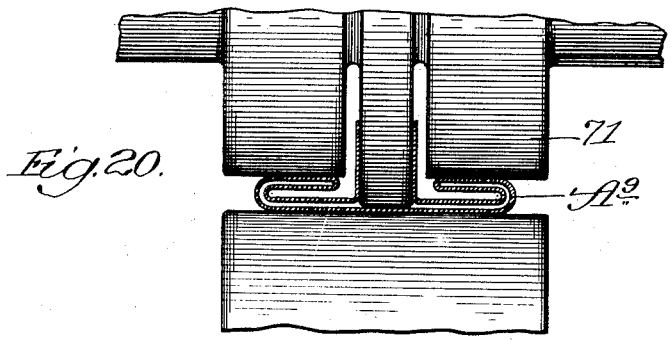
Figure 21:
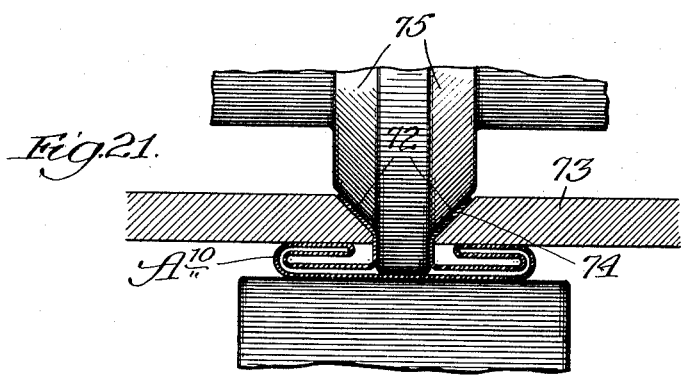

Fig. 7 shows the first pair of forming rolls 55 and 56 and Fig. 8 shows the strip $A^1$ as its edges are curved upwardly by these rolls. In Fig. 9 the roll 57 is flanged, while the roll 58 runs between the flanges so as to turn the side flanges of the strip $A^2$ vertically upward as it emerges therefrom as shown in Fig. 10. In Fig. 11, the upper forming roll consists of a central flange 59, conical flanges 60 passing at each side thereof and spaced therefrom, the cones converging toward the central flange. As the strip $A^3$ passes through this roller the upper edges of the strip will force it inwardly and curve it as shown in Fig. 12. A similar roll 61 is next in succession and closes the strip $A^4$ still further as shown in Fig. 14. Following these the rollers 62, 63 substantially closes the strip leaving it in the form $A^5$ as shown in Fig. 16. In practically all these rollers sufficient pressure can be applied to close the rollers to feed the strip along without the necessity of intervening feed rollers.

Figure 22:
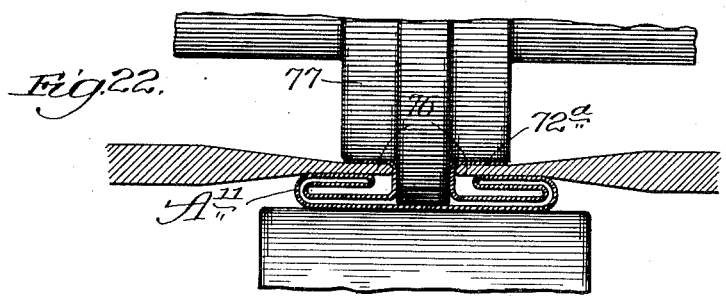

Figs. 17, 18 and 19 show the edges of feed rollers 64, 65—66, 67 and 68, 69 which bend up the sides of the strip at $A^6$ and $A^7$ and fold it over at $A^8$. This folding action is completed by rollers 70, 71 of Fig. 20 in which the strip assumes the form $A^9$. The central vertical flanges 72 of the strip $A^{10}$ are passed between stationary guides 73 which have bevel guideways 74 against which the flanges 72 are pressed by means of the conical rollers 75. In Fig. 22 the strip is given its final form by bending down these portions $72^a$ over the thin flat bar 76 by means of a roller 77.

Thus a completed grooved strip $A^{11}$ is formed which is double throughout the greater portion of its length and has an opening adapted to receive endwise the oppositely flanged edges 78 of the container 79. By this arrangement a much stronger and rigid connection is obtained and one which substantially prevents leakage around the joint. To further decrease any further possible leakage and render the joint still tighter, the connection may be pressed or hammered down as described.

The strip having been formed as previously described, then passes the shearing rollers 80 and 81 which separate the strips at the recesses 50 on the dotted lines as indicated in Fig. 4.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. A machine for forming grooved strips from flat sheet metal comprising a pair of shearing rolls adapted to neck said strip at intervals, means for folding the edges of said sheet inwardly along parallel lines intermediate the edges of the sheet so that the edges are near the center of the sheet, means for folding inwardly the new edges formed along said lines, and means for folding the first mentioned edges outwardly over said inwardly folded edges and in spaced relation thereto.

2. A machine for forming grooved strips from flat sheet metal comprising a pair of shearing rolls adapted to neck said strip at intervals, rotary means for folding the edges of said sheet inwardly along parallel lines intermediate the edges of the sheet so that the edges are near the center of the sheet, means for folding inwardly the new edges formed along said lines, and means for folding the first mentioned edges outwardly over said inwardly folded edges and in spaced relation thereto.

3. A machine for forming grooved strips from flat sheet metal comprising a pair of shearing rolls adapted to neck said strip at intervals, means for folding the edges of said sheet inwardly along parallel lines intermediate the edges of the sheet so that the edges are near the center of the sheet, means for folding inwardly the new edges formed along said lines, and a stationary plate and a roller above said plate for folding the first mentioned edges outwardly over said inwardly folded edges and in spaced relation thereto.

JOHN H. KILLION.